United States Patent
Chao et al.

(12) 
(10) Patent No.: US 6,580,913 B1
(45) Date of Patent: Jun. 17, 2003

(54) METHOD AND APPARATUS FOR DYNAMIC CHANNEL ALLOCATION FOR WIRELESS COMMUNICATION USING CHANNEL OCCUPANCY DATA

(75) Inventors: Pi-Hui Chao, Morris Plains, NJ (US); Chih-Lin I, Manalapan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/690,135

(22) Filed: Oct. 16, 2000

Related U.S. Application Data

(63) Continuation of application No. 08/881,625, filed on Jun. 24, 1997, now Pat. No. 6,178,329, which is a continuation of application No. 08/506,162, filed on Jul. 24, 1995, now abandoned, which is a continuation of application No. 08/156,506, filed on Nov. 23, 1993, now abandoned.

(51) Int. Cl.⁷ .................................... H04Q 7/30
(52) U.S. Cl. .................. 455/452; 455/62; 455/186.1; 455/561; 455/524
(58) Field of Search .................. 455/452, 15, 17, 455/507, 514, 524, 62, 63, 186.1, 186.2, 450, 453, 561

(56) References Cited

U.S. PATENT DOCUMENTS

| | | | | |
|---|---|---|---|---|
| 3,764,915 A | * | 10/1973 | Cox et al. | |
| 5,134,709 A | * | 7/1992 | Bi et al. | 455/33.1 |
| 5,212,822 A | * | 5/1993 | Fukumine et al. | 455/33.1 |
| 5,257,398 A | * | 10/1993 | Schaeffer | 455/33.1 |
| 5,442,807 A | * | 8/1995 | Takayama | 455/528 |
| 5,475,868 A | * | 12/1995 | Duque-Anton et al. | 455/62 |
| 5,497,505 A | * | 3/1996 | Koohgoli et al. | 455/63 |
| 5,577,168 A | * | 11/1996 | Haas et al. | 455/443 |

\* cited by examiner

*Primary Examiner*—Lester G. Kincaid
(74) *Attorney, Agent, or Firm*—Orrick, Herrington & Sutcliffe LLP

(57) ABSTRACT

The present invention concerns the efficient use of the radio spectrum in wireless communications. Channel occupancy data and channel availability data concerning a specific base station and its neighbors are used to assign frequency channels to mobile units and/or base stations. The channel occupancy and availability data may be located at a base station or at a mobile switching center. Channels are preferably assigned as channel pairs.

17 Claims, 8 Drawing Sheets

|   | 300 {      |   |   |   |   |   |   |   |   |
|---|---|---|---|---|---|---|---|---|---|
|   | 302 { | | | | | | | | 304 { |
|   | Channel Pair | | | | | | | | |
| Base Station | A | B | C | D | E | F | G | H | Available Pairs |
| 112 |   | X |   |   | X |   |   |   | 0 |
| 120 | X |   |   | X |   |   | X |   | 0 |
| 122 |   |   | X |   |   |   |   | X | 1 |
| 124 | X |   |   |   |   |   | X |   | 0 |
| 126 |   |   | X |   |   | X |   |   | 1 |
| 128 |   |   |   |   |   |   |   | X | 1 |
| 130 |   |   |   |   |   |   |   |   | 0 |

FIG. 4A

|     | \|←——————— 310 ———————→\| | | | | | | | | |
| --- | --- | --- | --- | --- | --- | --- | --- | --- | --- |
|     | \|←———— 312 Channel Pair ————→\| | | | | | | | | 314 |
| Base Station | A | B | C | D | E | F | G | H | Available Pairs |
| 126 |   |   | X |   |   | X |   |   | 1 |
| 112 |   | X |   |   | X |   |   |   | 0 |
| 124 | X |   |   |   |   |   | X |   | 0 |
| 128 |   |   | X |   |   |   |   | X | 1 |
| 132 |   |   |   |   |   |   |   |   | 0 |
| 134 |   |   |   |   |   |   |   |   | 0 |
| 136 |   |   |   |   |   |   |   |   | 0 |

FIG. 4B

FIG. 7A
| Base Station | A | B | C | # |
|---|---|---|---|---|
| 514 | X | | | 0 |
| 513 | | X | | 1 |
| 515 | | | X | 0 |
FIG. 7B
| Base Station | A | B | C | # |
|---|---|---|---|---|
| 514 | X | X | | 0 |
| 513 | | | X | 0 |
| 515 | | | X | 0 |
FIG. 8A
| Base Station | A | B | C | # |
|---|---|---|---|---|
| 513 | | X | | 1 |
| 514 | X | | | 0 |
| 512 | | | | 0 |
FIG. 8B
| Base Station | A | B | C | # |
|---|---|---|---|---|
| 513 | | | X | 0 |
| 514 | X | X | | 0 |
| 512 | | | | 0 |
FIG. 9A
| Base Station | A | B | C | # |
|---|---|---|---|---|
| 515 | | | X | 0 |
| 516 | | X | | 0 |
| 514 | X | | | 0 |
FIG. 9B
| Base Station | A | B | C | # |
|---|---|---|---|---|
| 515 | | | X | 0 |
| 516 | | X | | 0 |
| 514 | X | X | | 0 |

METHOD AND APPARATUS FOR DYNAMIC CHANNEL ALLOCATION FOR WIRELESS COMMUNICATION USING CHANNEL OCCUPANCY DATA

CROSS-REFERENCE TO RELATED APPLICATIONS

This application is a continuation application of U.S. application Ser. No. 08/881,625, filed on Jun. 24, 1997, now U.S. Pat. No. 6,178,329, which is a continuation of Ser. No. 08/506,162, filed on Jul. 24, 1995, now abandoned, which is a continuation of Ser. No.: 08/156,506, filed on Nov. 23, 1993, now abandoned.

FIELD OF THE INVENTION

The present invention relates to the field of wireless communication. More particularly, it relates to the efficient use of the radio frequency spectrum by wireless communication devices.

BACKGROUND OF THE INVENTION

Wireless communication networks are typically comprised of a mobile switching center, base stations and mobile/portable units ("mobile units"). The base stations are typically hardwired to the mobile switching center through communication lines such as optical communication lines. Each base station provides coverage for mobile units within a specified area called a "cell."

When a mobile unit is within a particular cell and requests access, the base station for that cell assigns a frequency channel pair to the mobile unit. The frequency channel pair is comprised of an "uplink" frequency channel, which is used for transmitting signals from the mobile unit to the base station, and a "downlink" frequency channel, which is used for receiving signals at the mobile unit from the base station. The frequency channel pair assigned to a particular mobile unit can be thought of as a single frequency channel and is often described as such by those skilled in the art. A mobile unit, such as a cellular telephone, can communicate with other mobile units or hardwired units, through its communications with a base station.

The use of mobile unit wireless communication devices such as cellular telephones, Personal Communications Networks (PCN), wireless Private Branch Exchanges (PBX's), and wireless Local Area Networks (LANs) is rapidly increasing. However, the radio frequency spectrum, which is used in wireless communications, is essentially comprised of a finite number of frequency channels. Various channel allocation techniques have been employed for the efficient use of this limited resource.

Dynamic Channel Allocation (DCA) is a broad title for several techniques for efficiently using the radio frequency spectrum. In DCA techniques, channel pairs are not preassigned to base stations.

Present DCA techniques can be grouped into two categories: traffic adaption and interference adaptation. "Timid," "Aggressive," and "m-Persistent Polite Aggressive" ("m-PPA") systems are examples of interference adaptation techniques. These techniques are also called distributed techniques because they allow mobile units to make decisions concerning channel allocation.

In a "Timid" technique a mobile unit measures the interference signal level on a channel pair and seizes that channel pair if the level indicates that no mobile units within a certain area, called a "neighborhood," are using that channel pair. In an "Aggressive" technique, a mobile unit, after an unsuccessful attempt to find an unused channel pair, sends out a "seize" signal on a channel whose interference level indicates that only one other mobile unit in the seizing mobile unit's neighborhood is using the corresponding channel pair. The other mobile unit, called the disturbed mobile unit, receives the "seize" signal and then looks for another channel pair. The "m-PPA" technique, is similar to the "Aggressive" technique, however, if the disturbed mobile unit cannot find another available channel pair the seizing mobile unit releases the seized channel pair and searches for another channel pair.

For "Timid," "Aggressive," or "m-PPA" techniques to work well, the mobile unit needs to be able to measure all channel pairs to determine which pair to make an attempt on. This may not be feasible. Furthermore, the "Aggressive" technique can become unstable because when one mobile unit disturbs another it may start a series of changes in channel pair occupancy.

The "m-PPA" technique appears to give the best results however this technique also has drawbacks. The delay introduced to see whether a disturbed mobile unit can find another channel pair may not be satisfactory. In addition, multiple attempts to seize channel pairs by multiple mobile units throughout a wireless network may create unsatisfactory levels of interference on many channels.

In traffic adaptation DCA techniques, channel pairs are assigned to or occupied by mobile units based on actual data concerning channel pair usage by mobile units. Traffic adaptation does not require the measuring of interference signal level but rather the reporting of data concerning actual channel pair usage. Maximum Packing DCA (MP DCA) is a theoretical optimum for a traffic adaptation technique. In MP DCA centralized information determines which frequency channel pairs are used by all mobile units in a network. Each time a mobile unit requests a frequency channel pair for communication, the best possible allocation scheme is determined and all channel pair allocations are updated. MP DCA requires centralized coordination and global information, which is almost impossible to achieve in a network with a large number of channels and cells.

SUMMARY OF THE INVENTION

One object of the present invention is to provide efficient use of frequency channels in wireless communication systems.

A further object of the invention to provide a dynamic channel allocation technique which does not introduce significant delay in setting up calls or communications between base stations and mobile units.

A further object of the invention is to provide a dynamic channel allocation technique, which produces a minimum amount of interference.

A further object of the invention is to provide an efficient traffic adaptation technique for channel allocation.

The above objects, as well as, other advantages are accomplished in one embodiment of the present invention by providing channel pair occupancy and channel pair availability data at each base station for that base station and for its neighboring base stations. The neighboring base stations can be defined using, for example, a 1-cell or 2-cell buffering reuse constraint. The data is preferably provided in the form of an augmented channel pair occupancy (ACO) table. In this embodiment, the channel pair occupancy and channel pair availability data is used to assign frequency channel pairs to requesting mobile units. Data in the table is changed based on channel pair occupancy and channel pair availability data received from neighboring base stations.

In another embodiment of the invention, dynamic channel allocation is accomplished by providing channel pair occupancy and channel pair availability data at a mobile switching center and using this data to assign channel pairs to requesting base stations and mobile units.

In another form of the present invention, data concerning channel pair occupancy by a base station and channel pairs available to a base station is transmitted from a base station to its neighboring base stations.

In another embodiment, channel pair occupancy and channel pair availability data is provided in the form of multiple tables located at a single mobile switching center and this data is used to assign channel pairs to base stations and mobile units. In another form of the present invention the same data is provided in a combined table located at a single mobile switching center and this data is used to assign channel pairs to base stations and mobile units.

BRIEF DESCRIPTION OF THE DRAWINGS

FIGS. 4A and 4B show exemplary ACO tables;

FIGS. 7A, 8A, 9A, and 10A show exemplary ACO tables for several base stations before channel assignment, where the tables are located at a single mobile switching center;

FIGS. 7B, 8B, 9B, and 10B show exemplary ACO tables for several base stations after channel assignment, where the tables are located at a single mobile switching center;

DETAILED DESCRIPTION

Figure 1:
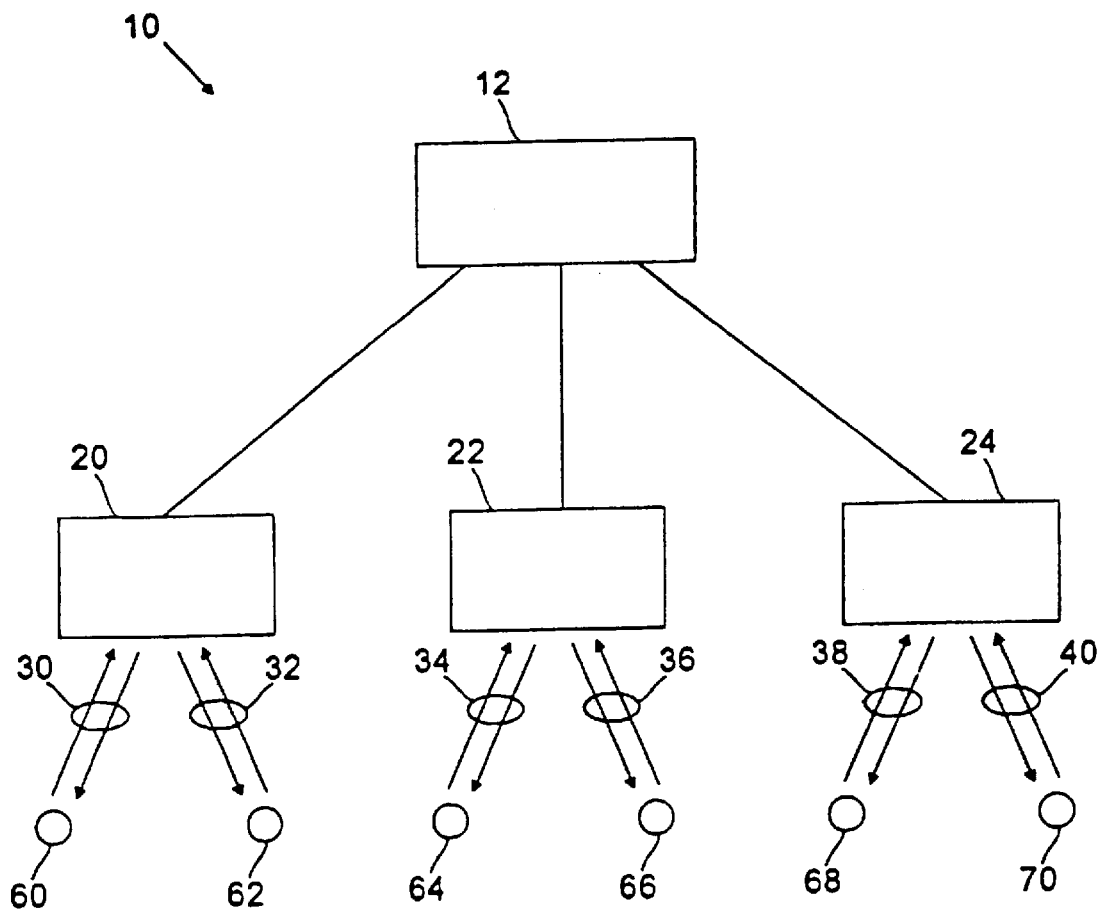
FIG. 1 illustrates a simplified wireless communication network.

FIG. 1 illustrates a simplified wireless communication network 10 comprising a mobile switching center 12, a plurality of base stations, including base stations 20, 22, and 24, frequency channel pairs 30, 32, 34, 36, 38, and 40, and mobile units 60, 62, 64, 66, 68, and 70.

Base station 20 is shown communicating to mobile units 60 and 62 through frequency channel pairs 30 and 32 respectively. Base station 22 is shown communicating to mobile units 64 and 66 through frequency channel pairs 34 and 36 respectively. Base station 24 is shown communicating to mobile units 68 and 70 through frequency channel pairs 38 and 40 respectively. A mobile unit requests access to a frequency channel pair on a request frequency channel and, if access is possible, is assigned a frequency channel pair.

If the appropriate channel pair or pairs are available, a mobile unit, such as mobile unit 60, can communicate with any other mobile unit within the network 10 or with any unit that is hardwire connected to the mobile switching center 12. Each base station is hardwire connected to the mobile switching center 12. Further devices, not shown may also be hardwire connected to the mobile switching center 12.

FIGS. 2, 3, 4A and 4B illustrate a simplified base station network 110 and more detailed aspects of base stations 112 and 126. These figures also illustrate the concept of neighboring base stations. The components of the figures will be described generally first and then in more detail with respect to the dynamic channel allocation apparatus and method of the present invention.

Figure 2:
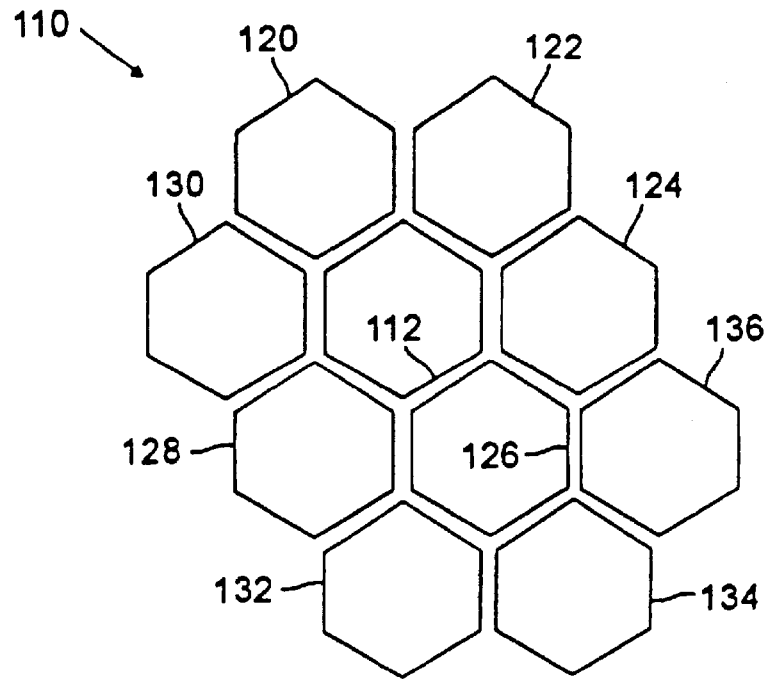
FIG. 2 illustrates a simplified base station network.

The base station network 110 of FIG. 2 includes base stations 112, 120, 122, 124, 126, 128, 130, 132, 134, and 136.

The base stations would typically be hardwired to a mobile switching center, such as mobile switching center 12, as shown in FIG. 1. The network 110 includes a plurality of further base stations which are not shown, and which may number in the hundreds, thousands, or more. Each base station has base stations adjacent to it, which in this example will be defined as its "neighboring" base stations. For example, base station 112 has neighboring base stations 120, 122, 124, 126, 128, and 130 while base station 126 has neighboring base stations 112, 124, 128, 132, 134, and 136.

In the simplified base station network 110 of FIG. 2, each base station is not permitted to use any of the frequency channel pairs which are used by any of its neighboring base stations. In this case, the "neighbors" are defined as the base stations which are adjacent another base station. For example, base station 112 is not permitted to use any of the frequency channel pairs being used by base stations 120, 122, 124, 126, 128, and 130. This constraint is known as a reuse constraint of 1-cell buffering. The concurrent use of frequency channels by a base station and one of its neighboring base stations results in poor communications between mobile units and base stations.

The 1-cell reuse constraint discussed is exemplary and a higher reuse constraint such as 2-cell may be used to define "neighbors." For a 2-cell reuse constraint, base station 112, for example, would also not be able to use a frequency channel being used by base stations 132, 134, or 136. Thus for a 2-cell reuse constraint, the "neighboring" base stations of base station 112 would include base stations 132, 134, and 136.

Figure 3:
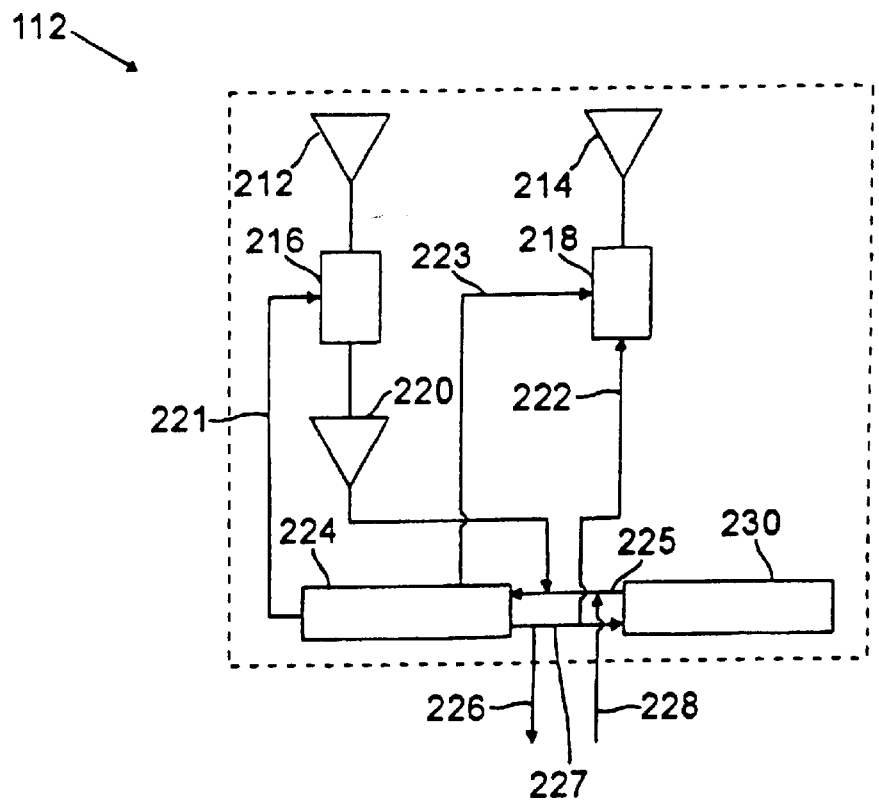
FIG. 3 shows an exemplary base station.

FIG. 3 shows a more detailed diagram of the base station 112, which comprises a receiving antenna 212, a transmitting antenna 214, a bandpass filter 216, a voltage controlled oscillator 218, an amplifier 220, a processor 224, an output port 226, an input port 228, and a storage device 230. The output port 226 and input port 228 are hardwired through communication lines to a mobile switching center such as the switching center 12 of FIG. 1. Voltage controlled oscillator 218 has a data signal input line 222. Processor 224 further comprises control lines 221 and 223, data signal input line 225, and data signal output line 227. The input port 226 and output port 228 may also be combined in a single bidirectional input/output port.

The general operation of a base station, such as base station 112, in communicating with a mobile unit will now be described. The processor 224 examines data storage device 230 to determine which channel pairs have been assigned by base station 112, and then cycles through the assigned channel pairs communicating with the respective mobile units.

For example, if channel pair "B" was assigned to a first mobile unit, processor 224 tunes bandpass filter 216 to the uplink frequency channel of channel pair "B" through control line 221. When a signal having that uplink frequency is received by receiver antenna 212 from a mobile unit, it is passed through bandpass filter 216, amplified by amplifier 220 and sent to processor 224. Processor 224 preferably includes a device such as an analog to digital converter to change the analog signal received at the receiver antenna 212 into a digital signal. The digital signal can then be sent from the base station either directly to another mobile unit or from the base station to a mobile switching center and then to another mobile unit or to a hardwired device, as known in the art.

To transmit signals to a mobile unit, the processor 224 sets the voltage controlled oscillator 218, through control line 223, to the downlink frequency of the assigned frequency channel pair, which in this example is channel pair "B." The processor 224 then sends digital signals out on its data signal output line 227. The digital signals are received at the data signal input 222 of the voltage controlled oscillator 218 and cause the oscillations to cease or continue depending respectively on whether a "1" or "0" digital signal is output. Other techniques known in the art for transmitting digital signals can also be used.

The processor 224 can change the receive frequency channel simply by tuning the bandpass filter 216 to a different frequency. The processor 224 can change the transmitted frequency channel by changing the control signal on control line 223 to change the frequency of the voltage controlled oscillator 218. The processor 224 thus can communicate through a plurality of frequency channel pairs to allow the base station to communicate with a plurality of mobile units.

Alternatively, a plurality of transmitting antennas and a plurality of receiving antennas can be provided as known in the art. Each transmitting antenna can be coupled to a filter or oscillator, which is set to transmit a specific frequency. Each receiver can be coupled to a filter, which is set to a particular frequency. With a plurality of transmitters and receivers, the processor can communicate with a plurality of mobile units at virtually the same time.

Also, a single receiving antenna coupled to a plurality of filters and a single transmitting antennas coupled to a plurality of filters or oscillators can be used.

FIGS. 4A and 4B show exemplary augmented channel pair occupancy (ACO) tables 300 and 310 for the base stations 112 and 126, respectively, of FIG. 2. The format of both tables 300 and 310 is the same and a general description of the type of information provided will be described with reference to table 300.

The table 300 is located in the storage device 230 of FIG. 3. The ACO table 300 includes channel pair occupancy data 302 and channel pair availability data 304 for base station 112 and its neighboring base stations, 120, 122, 124, 126, 128, and 130, where its "neighbors" are defined by a 1-cell buffering or 1-base station buffering reuse constraint.

Channel pair occupancy data 302 indicates whether a specific base station is using one of eight channel pairs A–H. For example, the row for base station 112 shows an "x" under columns labelled "B" and "E." This indicates that base station 112 is using channel pairs "B" and "E" (i.e. the base station is communicating with one mobile unit on channel pair "B" and another mobile unit on channel pair "E"). Similarly the row for base station 120 shows an "x" under columns labelled "A," "D," and "G" and this indicates that base station 120 is using channel pairs "A," "D," and "G." Channel pair occupancy information is similarly shown for the other neighboring base stations of base station 112, namely base stations 122, 124, 126, 128, and 130.

The channel pair availability data 304 of the ACO table 300 indicates whether there is a channel pair available for a particular base station. The number of channel pairs available to a base station depends on both the channel pairs that the base station is using and the channel pairs its neighboring base stations are using. For example, the row for base station 112 shows that base station 112 currently has "0" channel pairs available because every channel pair A–H is being used either by base station 112 or by one of its neighboring base stations 120, 122, 124, 126, 128, and 130. The lack of available channel pairs can be seen by observing that there is an "x" in each frequency channel pair column "A" through "H" in ACO table 300.

The channel pair availability data for neighboring base stations 120, 122, 124, 126, 128, and 130, which is shown in the channel pair availability data 304, cannot be determined by looking at the channel pair occupancy data 302. The channel pair availability data for each of neighboring base stations 120, 122, 124, 126, 128, and 130 comes from their own ACO tables. For example, the ACO table for base station 126 is shown in FIG. 4B. The ACO tables for base stations 120, 122, 124, 128, and 130 will be similar, however their neighboring base stations will differ.

The ACO table 310 located in base station 126, and shown in FIG. 4B, will now be described. The ACO table 310 has the same format as the ACO table 300 of FIG. 4A. The ACO table 310 includes channel pair occupancy data 312 for channel pairs "A" through "H" similar to the channel pair occupancy data 302 for channel pairs "A" through "H" in ACO table 300. The ACO table 310 also includes channel pair availability data 314 similar to the channel pair availability data 304 in FIG. 4A. The difference between table 300 for base station 112 and table 310 for base station 126 is that base station 112 has neighbors 120, 122, 124, 126, 128, and 130 while base station 126 has neighbors 112, 124, 128, 132, 134, and 136.

It can be seen by examining the channel pair availability data 314 of ACO table 310 that base station 126 has one channel pair available. This can also be seen by examining the columns of the channel pair occupancy data 312. The column for channel pair "D" does not have an "x" in it and this indicates that channel pair "D" is not being used by base station 126 or any of its neighboring base stations 112, 124, 128, 132, 134, or 136.

The number of channel pairs available to the other base stations 120, 122, 124, 128, 130, 132, 134, and 136 can be determined by examining the channel pair occupancy data of their ACO tables in the same manner as determined for base station 112 and 126. The number of channel pairs available to each neighbor is reported to base station 112 from its neighboring base stations 120, 122, 124, 126, 128, and 130 and stored as the channel pair availability data 304 of the table 300. For example, base station 126 has one free channel pair, channel pair "D," which is not being used by base station 126 or any of its neighboring base stations. Base station 126 sends a digital signal indicating the number of channels available, in this case "1," to the mobile switching center, such as the mobile switching center 12 in FIG. 1, which sends this digital signal to base station 112 via input port 228 shown in FIG. 3. Base station 112 records the information in the channel availability data 304 of its ACO table 300 in the row for base station 126, as the number folio.

The channel pair allocation operation of the embodiment shown by FIGS. 1–4 will now be described. A channel pair access request signal from a mobile unit is received by the receiver 212, shown in FIG. 3. The request signal is filtered by bandpass filter 216, which is tuned to an access signal frequency channel, amplified by amplifier 220, and processed by processor 224. The processor 224 determines that a channel pair access request has been received and then determines whether base station 112 has an available channel pair by examining the row for base station 112 in the channel pair availability data 304 of the ACO table 300.

Alternatively, the channel pair occupancy data 302 could be examined.

If there was such an available channel pair, the requesting mobile unit would be assigned that channel pair. Communications between the mobile unit and the base station 112 would then take place on that channel pair. In addition, the channel occupancy data 302 and the channel availability data 304 would be updated.

The channel pair availability data 304 in FIG. 4A, however shows "0" available channel pairs in the row for base station 112. Processor 224 determines that there are "0" available channel pairs for base station 112 and next examines the channel pair occupancy data 302 in the ACO table 300 to determine if there is a single-user channel pair which is not being used by base station 112 and which is being used by only one of the neighboring base stations 120, 122, 124, 126, 128, and 130. In this case, channel pairs "D" and "F" are only being used by base stations 120 and 126 respectively. This can be seen by the single "x" in the "D" and "F" columns of ACO table 300 of FIG. 4A.

Processor 224 then examines the channel pair availability data 304 to determine whether there is a channel pair available to either base station 120 or base station 126. In this case, the row for base station 120 shows "0" available channel pairs and the row for base station 126 shows "1" available channel pair. Thus, if base station 126 is bumped from channel pair "f" it will have another available channel pair.

Processor 224 then transmits a seize signal to the output port 226 to send to the mobile switching center to inform base station 126 that base station 112 will now be using channel pair "F." Base station 126 receives the seize signal from the mobile switching center and changes the channel pair assignment to its other available channel pair, channel pair "D." The processor 224 of base station 112 assigns channel pair "F" to the requesting mobile unit and updates the ACO table 300 to reflect changes in channel pair occupancy and channel pair availability. Both base stations 112 and 126 also send data to their respective output ports, such as output port 226 for base station 112, indicating the change in channel assignment so that neighboring base stations can update their own ACO tables. The data is sent to the mobile switching center, such as mobile switching center 12 in FIG. 1, which in turn sends it to the appropriate neighboring base stations.

Figure 5:
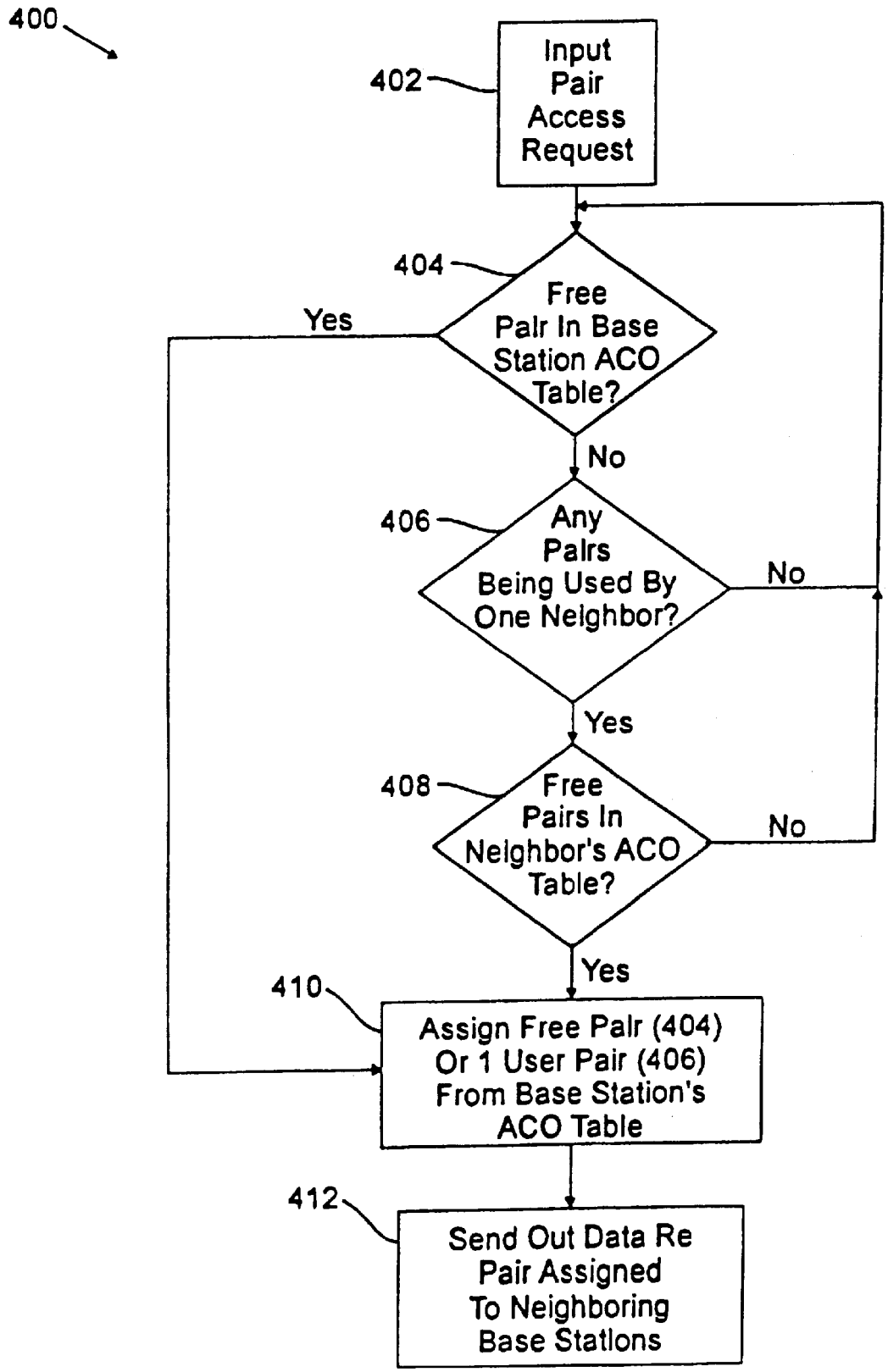
FIG. 5 shows a flow chart of a channel pair assignment method in accordance with the present invention.

A method in accordance with the present invention will now be described with reference to FIG. 15. FIG. 5 shows a flow chart 400 comprising blocks 402, 404, 406, 408, 410, and 412.

A mobile channel pair access request is received at a particular base station, such as base station 112, at block 402. The channel pair availability data in the ACO table for a particular base station, for example for base station 112, data 304 in table 300, is checked at block 404 to determine if a channel pair is available to that base station. If there is an available channel pair, the available channel pair or one of the available channel pairs is assigned to the mobile unit in block 410. If there are a plurality of available channel pairs, a particular available channel pair can be assigned on a random basis.

After the channel pair is assigned, communications between the base station and the mobile unit will take place over the assigned channel pair. In block 412, data concerning the channel pair assignment is sent out to neighboring base stations, which for base station 112 would comprise base stations 120, 122, 124, 126, and 130. The data is preferably digital and is first sent to a mobile switching center, such as, mobile switching center 12 in FIG. 1, via an output port, such as output port 226 in FIG. 3, and then to the appropriate base station.

If no available channel pairs are available to this base station, as was discussed above for base station 112, the channel pair occupancy data in the ACO table, such as data 302 in ACO table 300, is checked in block 406 to determine if there is a single-user channel pair which is not being used by this base station and which is being used by only one neighboring base station. If there is no such channel pair, the method loops back to block 404 to begin looking for available channel pairs again. The mobile unit access request, also known as a "call," can also be blocked instead of looping back to try again.

If there are such single-user channel pairs, the channel pair availability data of the ACO table, such as data 304 in FIG. 4A, is next checked in block 408 to determine if the neighboring base stations which are using these single user channel pairs have channel pairs available to them. If one of these neighboring base stations has an available channel pair, the current base station seizes the single user channel pair and assigns it to the requesting mobile unit in block 410. Digital signals specifying that this base station is now using the seized channel pair are sent out to the neighboring base stations such as the stations 120, 122, 124, 126, 128, and 130, in block 412. The neighboring base station which was formerly using the seized channel pair, such as station 126, will stop using the seized channel pair, such as channel pair "F," and use its available channel pair, such as channel pair "D."

The ACO tables can be stored in an array or table of memory locations in known memory devices such as a RAM. The RAM can store digital "1"'s to correspond to the "x"'s of the channel occupancy data such as data 302 shown in FIG. 4A. The tables can be updated simply by writing over a location in RAM. The RAM can also store the numbers indicating the channel availability data such as the data 304 shown in FIG. 4A.

Figure 6:
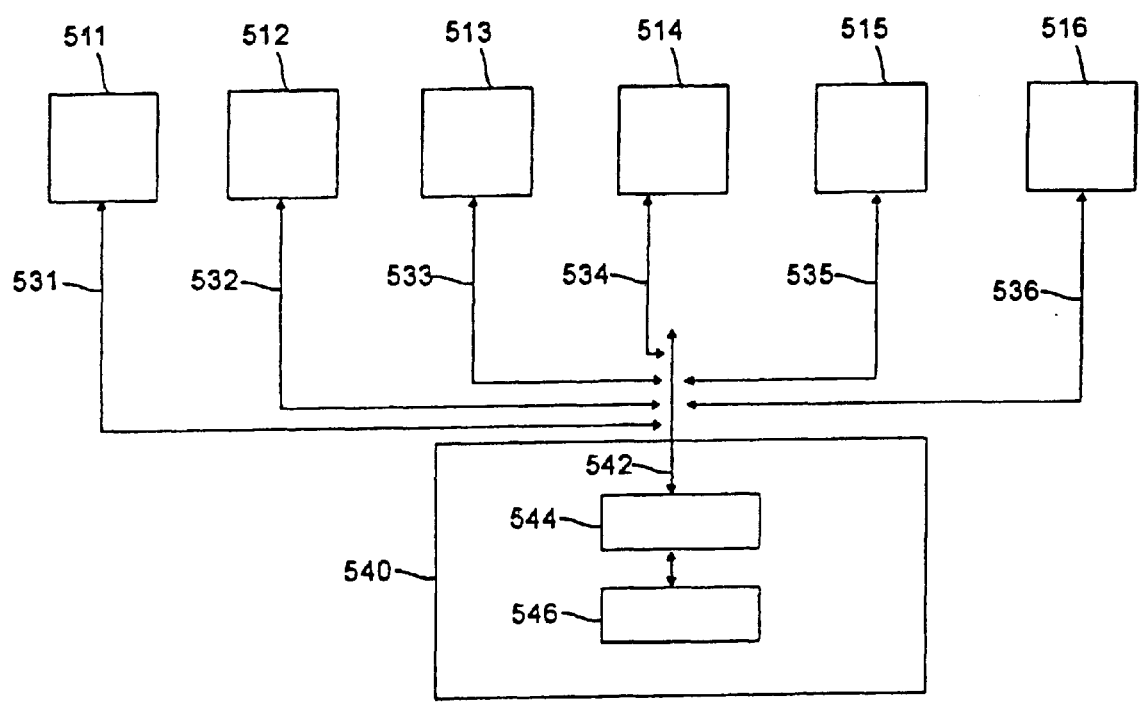
FIG. 6 illustrates a base station network hardwired to a mobile switching center.

FIG. 6 illustrates another embodiment of the present invention. In this embodiment, the ACO table information from all base stations in a specified area is contained in a mobile switching center 540. FIG. 6 illustrates base stations 511, 512, 513, 514, 515, and 516, and mobile switching center 540. The mobile switching center 540 is connected to numerous further base stations which are not shown and which may number in the hundreds or thousands. The mobile switching center 540 includes a data bus 542, a processor 544 and storage device 546, such as a RAM, for storing channel pair occupancy and availability data. Base stations 511, 512, 513, 514, 515, and 516 are connected to the data bus 542 of the processor 544 by bidirectional lines 531, 532, 533, 534, 535 and 536 respectively.

FIG. 6 is a simplified example in which it will be assumed that each base station has only two neighboring base stations, one to its right and one to its left. Thus, for example base station 514 has two neighboring base stations, 513 and 515. Base station 513 similarly has two neighboring base stations 512 and 514, and base station 515 similarly has two neighbors 514 and 516.

Figure 10A:
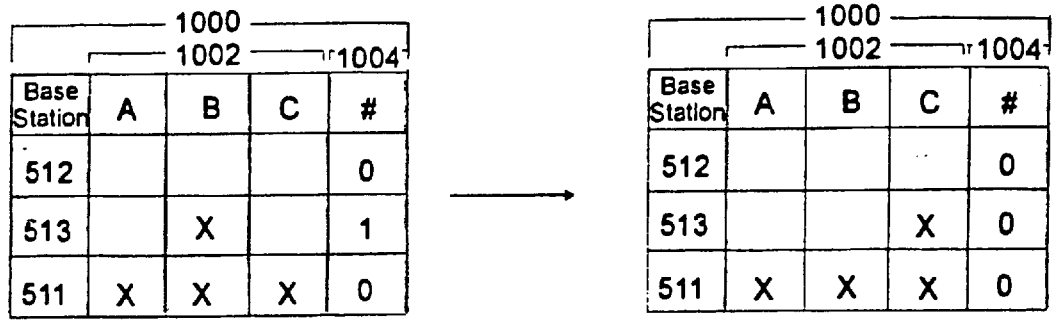
Figure 10B:
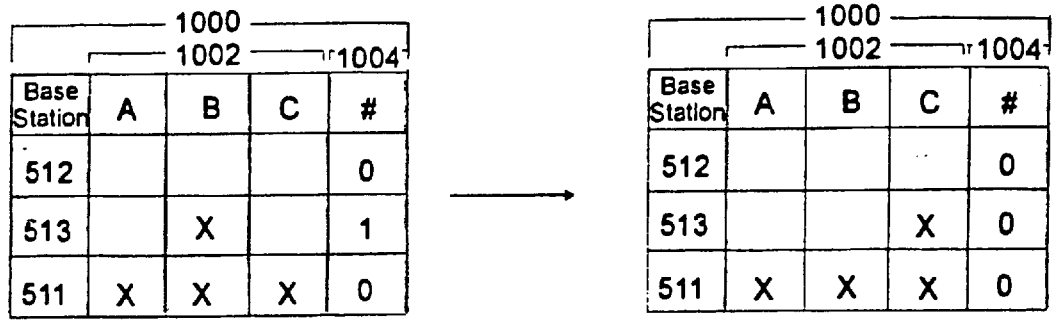
Figure 11A:
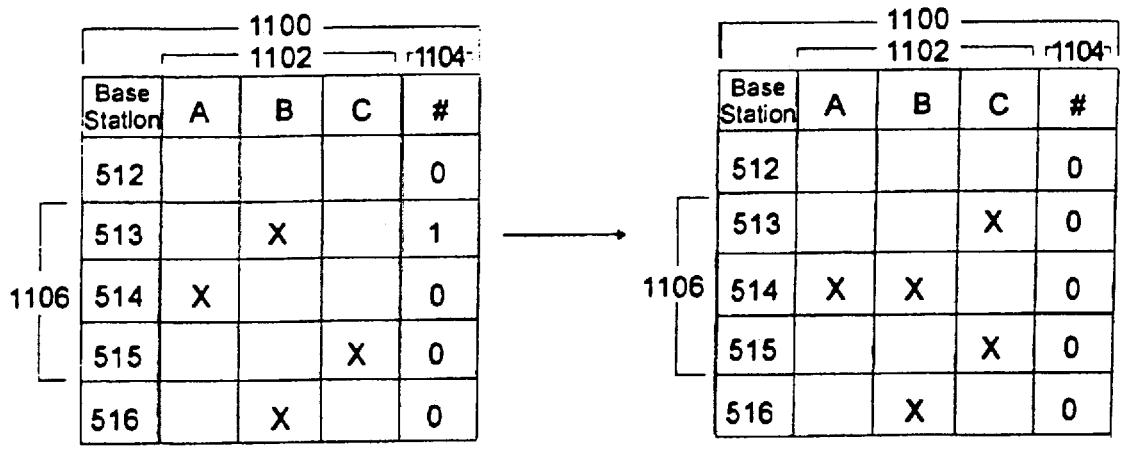
FIG. 11A illustrates an ACO combined table before channel assignment located at a single mobile switching center.

Storage device 546 is adaptable for storing sets of data concerning channel pair occupancy and channel pair availability for base stations 511–516. Each set of data may be in the form of an ACO table for each base station similar to the table shown in FIGS. 4A and 4B. For example, FIGS. 7A, 8A, 9A, and 10A show ACO tables for base stations 514, 513, 515 and 512, respectively, which are all located in the single mobile switching center 540. FIGS. 7B, 8B, 9B, and 10B show the same tables after channel pair assignment. The sets of data may also be in a single table as shown in FIG. 11A before channel pair assignment and FIG. 11B after channel pair assignment.

FIGS. 7A–B, 8A–B, 9A–B, and 10A–B include ACO tables 700, 800, 900, and 1000 respectively. The ACO tables 700, 800, 900, and 1000 further comprise channel pair occupancy data 702, 802, 902, and 1002 and channel pair availability data 704, 804, 904, and 1004 respectively. Each ACO table contains data similar to that of FIGS. 4A and 4B.

For example, FIG. 7A shows channel pair occupancy data 702 for three-channel pairs "A," "B," and "C." As explained with reference to FIG. 4A, an "x" under those columns indicates that a base station is using that frequency channel pair to communicate with a mobile unit. FIG. 7A shows that base station 514 is using channel pair "A," base station 513 is using channel pair "B," and base station 515 is using channel pair "C." FIG. 7A also includes channel availability data 704 which includes the number of channels available to a particular base station. The channel availability data is labeled "#." In FIG. 7A, base stations 514, 513, and 515 have "0," "1," and "0" channels available respectively.

The channel pair allocation operation of the present invention will be described for the multiple tabular embodiment in a single mobile switching center 540 with reference to FIGS. 6–10. When a mobile unit requests access to a channel pair, for example from the base station 514, the base station 514 sends a request to the processor 544 of the mobile switching center 540 through bidirectional line 534 and the data bus 542. The processor 544 then examines the channel pair availability data for base station 514 in storage device 546 to determine if there are available channels. For the multiple tabular case, the processor 544 examines the row for base station 514 of the channel pair availability data 704, shown in FIG. 7A.

If there was an available channel pair, then that channel pair would be assigned to base station 514. However, in this case, base station 514 has "0" available channel pairs. Next, the processor 544 checks the channel pair occupancy data 702 in the ACO table 700 in FIG. 7A to see if there are any single-user channel pairs which are not being used by base station 514 and which are being used by only one neighboring base station. The columns for channel pairs "B" and "C" of the channel pair occupancy data 702 show that channel pairs "B " and "C" are being used by only base stations 513 and 515 respectively. The processor 544 next examines the rows for base station 513 and 515 of channel pair availability data 704 to determine whether either of the base stations 513 or 515 has any available channel pairs. The channel pair availability data 704 shows that the base station 513 has "1" channel pair available and base station 515 has "0" channel pairs available. Therefore, the processor 544 assigns base station 514, and the requesting mobile unit, channel pair "B." The assignment data is sent out to base station 514 from processor 544 through data bus 542 and bidirectional line 534.

Base station 513 is "bumped" from channel pair "B" and assigned a new channel pair by first examining the channel pair occupancy data 802 of its ACO table 800 in FIG. 8A to determine which channel pair is available. The column for channel pair "C" has no "x"'s in it indicating that channel pair "C" is currently not being used by base station 513 or its neighboring base stations 514 and 512. Thus, channel pair "C" is assigned to base station 513. The assignment data is sent out to base station 513 from processor 544 through data bus 542 and bidirectional line 533.

The channel pair occupancy data 702 and 802 for base stations 514 and 513 as shown in FIGS. 7A and 8A, are modified after channel pair "B" is assigned to base station 514, base station 513 is bumped from channel pair "B," and channel pair "C" is assigned to, base station 513. The updated ACO data after all of these operations are complete are shown in FIGS. 7B and 8B. The channel pair occupancy data in the ACO tables for the neighboring base stations of base stations 513 and 514, are also updated. The original ACO tables 900 and 1000 for base stations 515 and 512 are shown in FIGS. 9A and 10A, respectively. The updates of those tables are shown in FIGS. 9B and 10B. The data can be updated simply by writing over the contents of memory locations in RAM.

In general, if a base station is assigned a channel pair or bumped from a channel pair, the channel pair occupancy data of the ACO tables of all the neighbors of that base station should be updated. Furthermore, when the channels available to a particular base station change, such as the change observed in the row for base station 513, from FIG. 7A to FIG. 7B in the channel availability data 704 column, the channel availability data of the ACO tables of all of that base station's neighbors should be updated. In this case, the neighbors would be base station 514 and 512.

Channel availability data for a particular base station can be determined by processor 544 examining the channel occupancy data as described for FIGS. 4A and 4B. For example, for base station 514, the table in FIG. 7A is examined by processor 544 to determine that there is an "x" in each channel column and that therefore there are no channel pairs available. This data is stored as the number "0" as shown in data 704 in the row for base station 514 of FIG: 7A.

The number of base stations hardwired to a mobile switching center is usually much larger than the number of neighboring base stations surrounding any one base station. The present invention provides a dynamic channel allocation technique, which operates only on a base station and its neighbors and not the entire network. Although FIG. 6 shows only 6 base stations connected to the mobile switching center 540, there are typically hundreds or thousands of such base stations.

Figure 11B:
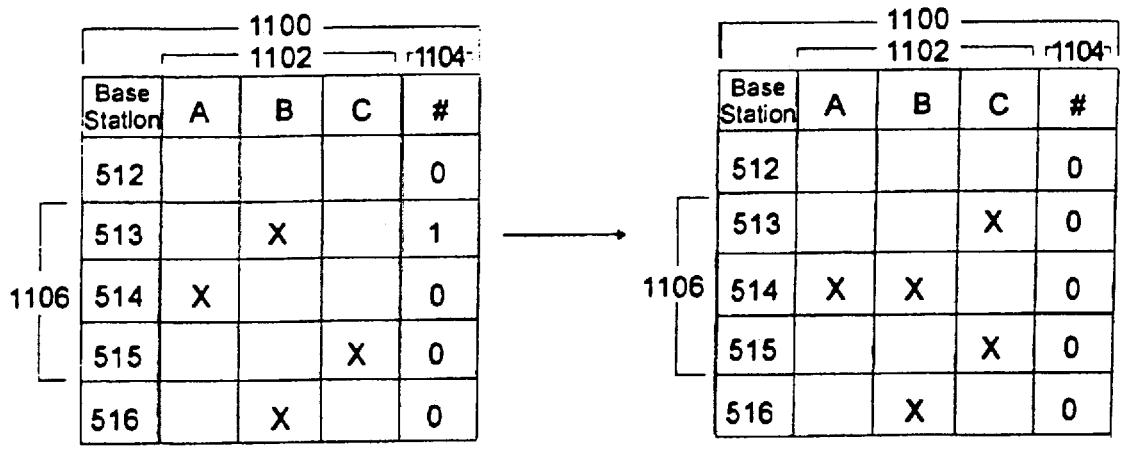
FIG. 11B illustrates an ACO combined table after channel assignment located at a single mobile switching center.

The data shown in FIGS. 7A–B, 8A–B, 9A–B, and 10A–B is duplicative. For example, the row for base station 514 in FIG. 7A is the same as the row for base station 514 in FIG. 8A. Since the tables of FIGS. 7A, 8A, 9A, 10A (and later when they are modified 7B, 8B, 9B, and 10B) are located in the same mobile switching center, it is preferable to combine the tables into one combined table as shown in FIGS. 11A–B. By combining the tables, duplicative data can be eliminated and substantial memory savings in the mobile switching center are achieved. In addition, changes in channel occupancy data and channel availability data need only be made once.

Channel pair assignment in the single table case located in a single mobile switching center functions in largely the same manner as the multiple tabular case located in a single mobile switching center, described with reference to FIGS. 7A–B, 8A–B, 9A–B, 10A–B. However, when the processor 544 examines the ACO tabular information for a particular base station it looks at a particular set of data in the combined table.

For example, for base station 514, the set of data labelled 1106, in FIGS. 11A and 11B would be examined for channel pair occupancy and availability data, to determine if a channel could be assigned. The data labelled 1106 is exactly the same as the table shown in FIG. 7A.

In this application, the term base stations includes microcells such as disclosed in "Microcells in Personal Communications Systems," IEEE Communications Magazine, December 1992.

Various modifications to the embodiments disclosed will be apparent to one skilled in the art.

We claim:

1. A method for allocating a communication channel to a mobile unit from among a plurality of channels available to a base station and its neighboring base stations, comprising the steps of:

storing channel occupancy data for said base station directly from channel allocations by said base station and by each of its neighboring base stations, wherein said channel allocations are independent of channel measurements and wherein said channel allocations for said neighboring base stations are provided to said base station by said neighboring base stations;

storing channel availability data identifying the number of said available channels which are available for allocation by each base station based on each base station's channel occupancy data, each base station's channel occupancy data identifying said available channels which have already been allocated by that base station and its neighboring base stations;

receiving a channel access request at said base station from a mobile unit;

determining from said channel occupancy data whether there is a first one of the available channels which has not already been allocated by said base station and by any of its neighboring base stations, or if no first channel exists, determining from said channel occupancy data for said base station whether there is a second channel which has not been allocated by said base station and has been allocated by only one of its neighboring base stations and, if no first channel exists, determining from said channel availability data whether the neighboring base station has a third channel available for allocation;

allocating said first channel to the mobile unit if one exists and updating the channel occupancy data to reflect that said first channel has been allocated, or if no first channel exists, allocating said second channel to the mobile unit, if such a second channel exists and the corresponding neighboring base station has said third channel available for allocation, and updating the channel occupancy data and channel availability data to reflect the allocation.

2. The method of claim 1 further comprising the step of:
receiving data corresponding to the channels allocated by neighboring base stations and storing that data as part of said channel occupancy data.

3. The method of claim 1 further comprising the step of:
receiving data corresponding to the number of channels available for allocation by neighboring base stations and storing that data as part of said channel availability data.

4. The method of claim 1 further comprising the step of:
sending channel occupancy data to neighboring base stations following the allocation of a channel by the base station.

5. The method of claim 1 further comprising the step of:
sending channel availability data to neighboring base stations following allocation of a channel by the base station.

6. The method of claims 1 wherein each channel is comprised of a pair of channels.

7. The method of claim 6 wherein the neighboring base stations are defined by a reuse constraint of one cell buffering.

8. The method of claim 6 wherein the neighboring base stations are defined by a reuse constraint of two cell buffering.

9. The method of claim 1 wherein the neighboring base stations are defined by a reuse constraint of one cell buffering.

10. The method of claim 1 wherein the neighboring base stations are defined by a reuse constraint of two cell buffering.

11. A mobile switching center for allocating a communication channel to a base station from among a plurality of channels available to said base station and its neighboring base stations comprising:

a processor having an input and an output;

a storage device having an input and an output, the output of the storage device being connected to the input of the processor and the input of the storage device being connected to the output of the processor, wherein the storage device stores channel occupancy data and channel availability data for said base station, said channel occupancy data is compiled directly from channel allocations by said switching center to said base station and each of its neighboring base stations, wherein said channel allocations are independent of channel measurements and wherein said channel allocations for said neighboring base stations are provided to said switching center by said neighboring base stations, and said channel availability data identifies the number of said available channels which are available for allocation to each of said base stations based on each base station's channel occupancy data, each base station's channel occupancy data identifying said available channels which have already been allocated to that base station and its neighboring base stations;

wherein the processor receives at its input a channel access request from said base station and allocates a channel which is available for allocation to said base station based on the channel occupancy data and the channel availability data for that base station in the storage device;

wherein the processor examines the channel occupancy data for said base station and allocates a first channel, if such a first channel exists, which has not been allocated to said base station and any of its neighboring base stations and updates the channel occupancy data and channel availability data to reflect the allocation; and wherein the processor, if no such first channel exists, examines the channel occupancy data to determine if there is a second channel which has not been allocated to said base station and which has been allocated to only one base station and if there is such a second channel, said processor examines the channel availability data to determine if there is a third channel available for allocation to the neighboring base station, and if such second and third channels exist said processor allocates said second channel to said base station and updates the channel occupancy data and channel availability data to reflect the allocation.

12. The mobile switching center of claim 11 wherein the neighboring base stations are defined by a reuse constraint of one cell buffering.

13. The mobile switching center of claim 11 wherein the neighboring base stations are defined by a reuse constraint of two cell buffering.

14. The mobile switching center of claim 11 wherein each channel is comprised of a pair of channels.

15. The mobile switching center of claim 14 wherein the neighboring base stations are defined by a reuse constraint of one cell buffering.

16. The mobile switching center of claim 14 wherein the neighboring base stations are defined by a reuse constraint of two cell buffering.

17. A base station comprising:

means for receiving signals from a plurality of mobile units on a plurality of frequency channels available to said base station and its neighboring base stations means for transmitting signals to the plurality of mobile units on said plurality of frequency channels;

storage means for storing frequency channel occupancy data and channel availability data for said base station, said channel occupancy data is compiled directly from channel allocations, wherein said channel allocations are independent of channel measurements and wherein said channel allocations for said neighboring base stations are provided to said base station by said neighboring base stations, and said channel availability data identifies the number of said available channels which are available for allocation to each of said base stations based on each base station's channel occupancy data, each base station's channel occupancy data identifying said available channels which have already been allocated to that base station and its neighboring base stations;

a processor for allocating frequency channels to the requesting mobile units from among the plurality of available channels wherein the processor allocates frequency channels to the mobile units which are available for allocation, said channels available for allocation being determined from said channel occupancy data and channel availability data for that base station in the storage device;

wherein the processor examines the channel occupancy data for said base station and allocates a first channel, if such a first channel exists, which has not been allocated to said base station and any of its neighboring base stations and updates the channel occupancy data and channel availability data to reflect the allocation; and wherein the processor, if no such first channel exists, examines the channel occupancy data to determine if there is a second channel which has not been allocated to said base station and which has been allocated to only one base station and if there is such a second channel, said processor examines the channel availability data to determine if there is a third channel available for allocation to the neighboring base station, and if such second and third channels exist said processor allocates said second channel to said base station and updates the channel occupancy data and channel availability data to reflect the allocation.

* * * * *